United States Patent [19]

Pallishusky

[11] 3,950,863
[45] Apr. 20, 1976

[54] METHOD AND MEANS FOR TEACHING ALPHABET RECOGNITION AND LEARNING HANDWRITING

[76] Inventor: Sylvia Minka Pallishusky, P.O. Box 384, Cape May Courthouse, N.J. 08210

[22] Filed: Mar. 24, 1975

[21] Appl. No.: 561,205

[52] U.S. Cl. ................................. 35/36; 35/35 R
[51] Int. Cl.² ........................................ G09B 11/00
[58] Field of Search ............. 35/26, 28, 35 R, 35 H, 35/35 J, 36, 37, 8 R; 40/125 A

[56] References Cited
UNITED STATES PATENTS

| | | | |
|---|---|---|---|
| 819,877 | 5/1906 | Gilman | 35/36 X |
| 2,280,609 | 4/1942 | Williamson | 35/28 X |
| 2,293,887 | 8/1942 | Chamberlain | 35/35 R X |
| 2,369,804 | 2/1945 | Schoolfield et al. | 35/35 H |
| 2,499,838 | 3/1950 | Smith | 35/26 |
| 2,682,118 | 6/1954 | Larsen | 35/35 H |
| 3,253,358 | 5/1966 | Wright | 35/8 R |
| 3,774,319 | 11/1973 | Sprowls | 35/37 |

*Primary Examiner*—William H. Grieb
*Attorney, Agent, or Firm*—Max R. Millman

[57] ABSTRACT

A method and means of teaching children alphabet recognition and learning handwriting in which a plurality of transparencies are provided, each with one of the nine basic shapes required to construct all the letters, lower and upper case, and a transparency of a figure, such as a house, is also provided with the floors or stories defining the desired spacing. The transparencies are superimposed stepwise to construct a given letter in the spatial boundaries and the child, using a kit comprised of a card on which the figure is represented and components, such as plastic pieces, in the form of the nine basic shapes, repeats the demonstrated method. Thereafter, the child repeats the letter constructing process by removably placing basic letter components on a picture of the figure on the wall or easel so that the teacher may observe the child's learning progress. Finally, the child draws the letters on papers having horizontal lines spaced apart for proper placement of the letters.

10 Claims, 8 Drawing Figures

METHOD AND MEANS FOR TEACHING ALPHABET RECOGNITION AND LEARNING HANDWRITING

This invention relates to alphabet recognition and learning handwriting. It is based on applicant's conclusions and those of many other educators that children, generally 5 to 7 years old, learn best using tactile and kinesthetic experience with the letters.

The primary object of the invention is to provide a means and method of teaching alphabet recognition and subsequently handwriting using components in the form of nine basic shapes from which all upper and lower case letters can be constructed and demonstrating, with pupil work participation, the step by step method of constructing the letters from these elements.

Another object of the invention is to provide a teaching method and means of the character described in which the pupil is taught, with its participation, the spatial relationship of the letter components and the position of the constructed upper and lower case letters relative to a figure, such as a house, having several floors which define the spaces into which a particular letter should fit.

Another object of the invention is to provide a teaching method and means of the character described in which the child is provided with a kit containing one or more cards on which the same figure is represented and the letter components of the nine basic shapes, so that the child can place the components on the card and thereby construct the letter as the teacher demonstrates the stepwise order and direction of construction.

Another object of the invention is to provide a teaching method and means of the character described which includes a picture on the wall representing the figures used by the teacher in her demonstration of letter construction upon which the child can place other components of the nine basic shapes in varying sizes which are made to be removably retained thereon in the spatial position required to construct the given letter, during which process the teacher can observe the pupil's learning progress. Finally, papers will be provided for each pupil without the representation of the figure thereon but with spaced horizontal lines on which the pupil can write the letters it had previously constructed of the basic components.

Essentially, the aforedescribed method is carried out by providing transparencies, one of which has imprinted thereon a figure, such as a house with spaced floors or stories. Another transparency will contain a star indicating a starting point and a third will contain an arrow indicating the direction of letter construction (or letter writing). The others will each have imprinted thereon one of the nine basic letter components in different sizes to proportionately construct all 52 letters of the alphabet, upper and lower case. By starting with the figure transparency and then stepwise superimposing the transparencies of the star, the arrow and the components required for a particular letter, and stepwise projecting them on a screen or wall, the teacher demonstrates, and the child follows the stepwise directional construction of the letter using his or her own kit materials. Thereafter, the child carries out the construction before the teacher, then alone, and finally draws the letter on paper without the figure represented thereon.

These and other objects of the invention will become more apparent as the following description proceeds in conjunction with the accompanying drawings wherein.

Figure 8:
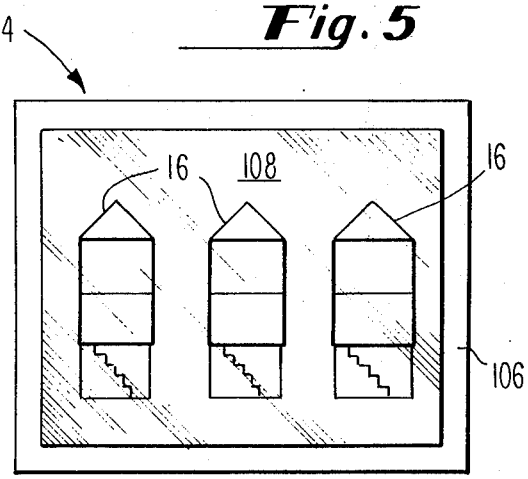
Figure 7:
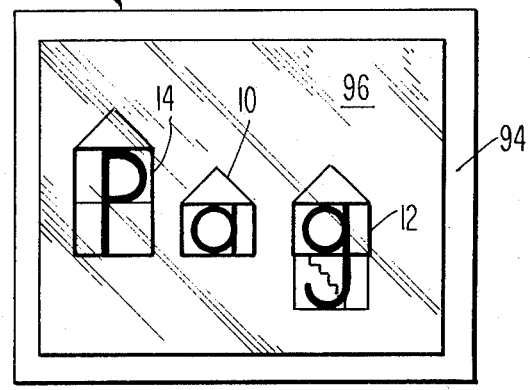

FIG. 7 is a front elevational view of a picture of the three different size houses for mounting on a wall with letter components removably placed in the houses to form various letters; and FIG. 8 is a view similar to FIG. 7 with several illustrations of the final two-story house plus basement upon which the child can practice and demonstrate the placement in selected areas of components making up various letters.

Specific reference will now be made to the drawings in which similar characters are used for corresponding elements throughout.

There are nine basic shapes from which all 26 letters of the alphabet (actually 52 inclusive of lower and upper case letters) can be constructed, the "U" shape, the "C" shape, the "O" shape, the hook "J", the diagonal line "/", the straight line "l", the half circle "ɔ", the dot ".", and the half-hook "ɔ". In order to be able to construct all the upper and lower case letters, these basic shapes will have to be provided in different sizes to make up 18 separate components.

Considering that the invention is concerned not only with teaching alphabet recognition, but also writing the letters, the teaching of the spatial relationship of constructed letters so that the pupil can transfer this learning to the way in which it ultimately should write the letter on lined paper is an important element in the teaching process. To aid in the child's comprehension of this spatial requirement, the instant invention begins with the representation of a figure familiar to the pupil having horizontal lines which will serve to frame the constructed letters. For this purpose, the representation of a house was found most suitable. The house can be a single story house 10, a one-story house with basement 12, a two-storied house 14, and ultimately, to fit all letter possibilities, the two-storied house and basement 16.

The pupil will be supplied with a kit in the form of a box having four cards upon which is imprinted, preferably in black, the four different houses 10, 12, 14 and 16. It will also contain 31 plastic pieces (in addition to a star and an arrow), all preferably green, preformed of the aforementioned nine basic shapes in the varying sizes required to construct the upper and lower case letters. The reason for providing 31 pieces instead of merely 18 is that for the construction of certain letters the basic straight line or bar will require to be preformed or cut at various angles and duplicates of the same figure are required for use more than once in a given letter. In addition to the kit, each pupil will have a workbook with a short story (which will be read to the pupil) to acquaint the pupil with the concept that all the letters, large and small, can be made of 18 basic shaped elements or components and practice pages for drawing the elements.

Coming now to the teacher demonstration aspect of the invention, the teacher's object is to demonstrate to the pupils how each letter is constructed of the various components, the order of construction, the framing of the letters between horizontal lines, as well as the starting point and direction of ultimately writing the letter, and in the instant invention this is accomplished with the use of an overhead projector and superimposition of transparencies stepwise to build up the letter which the pupil can duplicate with his kit as the teacher goes along with the demonstration.

Thus, stepwise, the teacher projects on a screen or the wall a transparent relatively thin plastic sheet 18 upon which is imprinted the figure of the house 10, 12, 14 or 16. Consider for the time being that the teacher is using the complete two-storied plus basement house 16. It will be seen that the horizontal line 20 is the bottom of the basement and constitutes one framing line, the next upper horizontal line 22 is the ground floor level constituting a second framing line, the next upper horizontal line 24 is the second floor level constituting a third framing line and the final upper horizontal line 26 is the level of the ceiling or of entrance into the attic 28 and is a fourth framing line.

Figures 2, 3, 4:
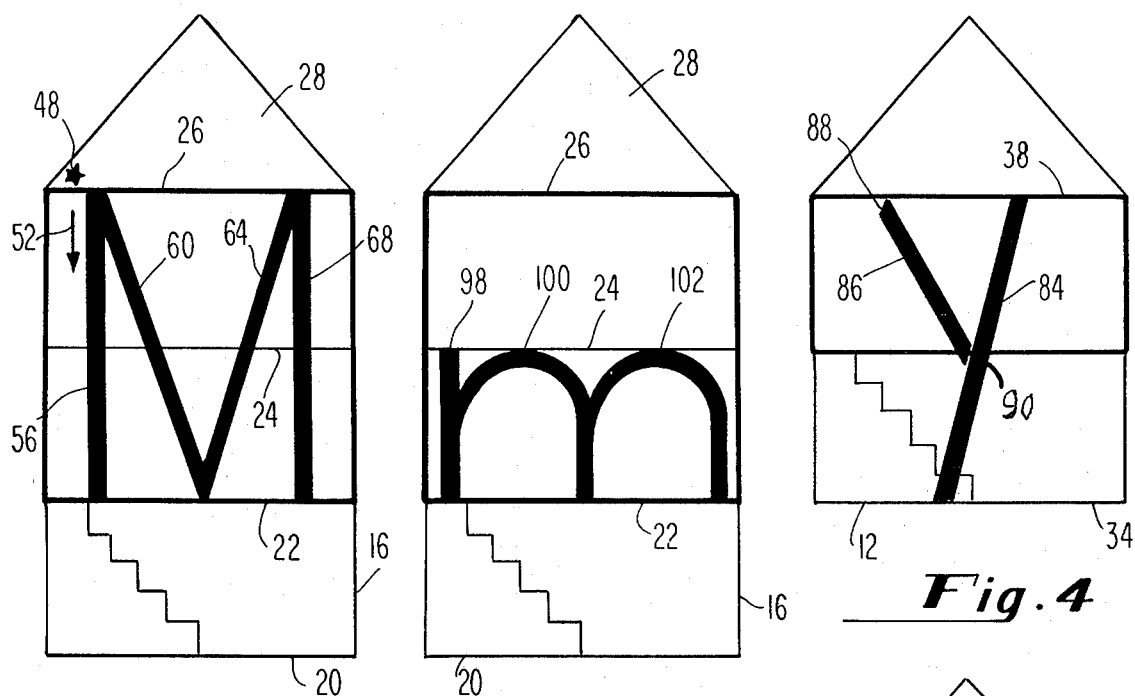
FIG. 2 is a face view of the superimposed transparencies of FIG. 1 showing the completed construction of the upper case letter M, for illustrative purposes.
FIG. 3 is a face view similar to FIG. 2 showing the construction from appropriate letter components and spatial placement of the components to form the lower case letter $m$, for illustrative purposes.
FIG. 4 is a face view similar to FIG. 2 but of a different size house (one story with basement) and the upper case letter Y, for illustrative purposes, constructed of the appropriate letter components placed therein.
Figure 5:
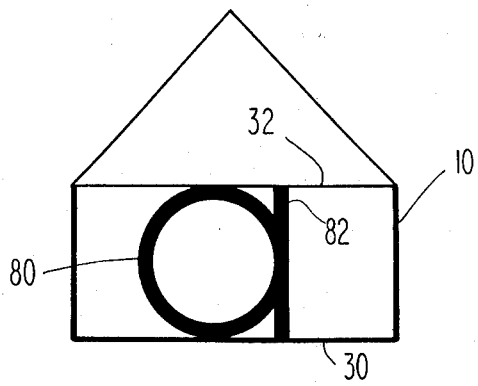
FIG. 5 is a face view similar to FIG. 2 of a one-story house having the appropriate letter components placed therein to form the lower case letter a, for illustrative purposes.
Figure 6:
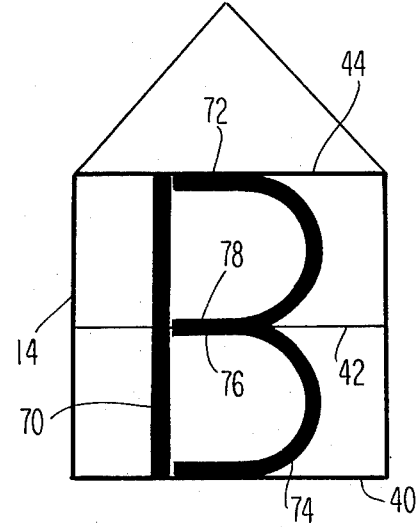
FIG. 6 is a face view similar to FIG. 4 of a two-story house with appropriate letter components placed therein to form the upper case letter B, for illustrative purposes.

In the other house representations, in FIG. 5, the single-story house, the ground level is 30 and the ceiling or entrance to the attic is 32. In FIG. 4, the one-story house with basement, the basement floor is 34, the ground level is 36 and the ceiling or entrance to the attic is 38. In FIG. 6, the two-story house without basement, the ground level is 40, the second floor level is 42 and the ceiling or entrance to the attic is 44.

After the teacher projects the transparent sheet 18, an equivalent card from the pupil's kit of which is now before the pupil, the teacher superimposes another relatively thin transparent plastic sheet 46 having a star 48 thereon, preferably red, which will fall at a particular place on the house figure to indicate the place to start forming the letter. This is shown in FIG. 2 and it should be noted that for different letters the starting star will be located at different places on the house. This can be accomplished by superimposing sheet 46 on sheet 18 at different positions.

Then a third relatively thin transparent sheet 50 having an arrow 52 thereon is superimposed on sheet 46 so that the arrow falls below the star to indicate the direction of constructing the letter, and ultimately writing it.

Figure 1:
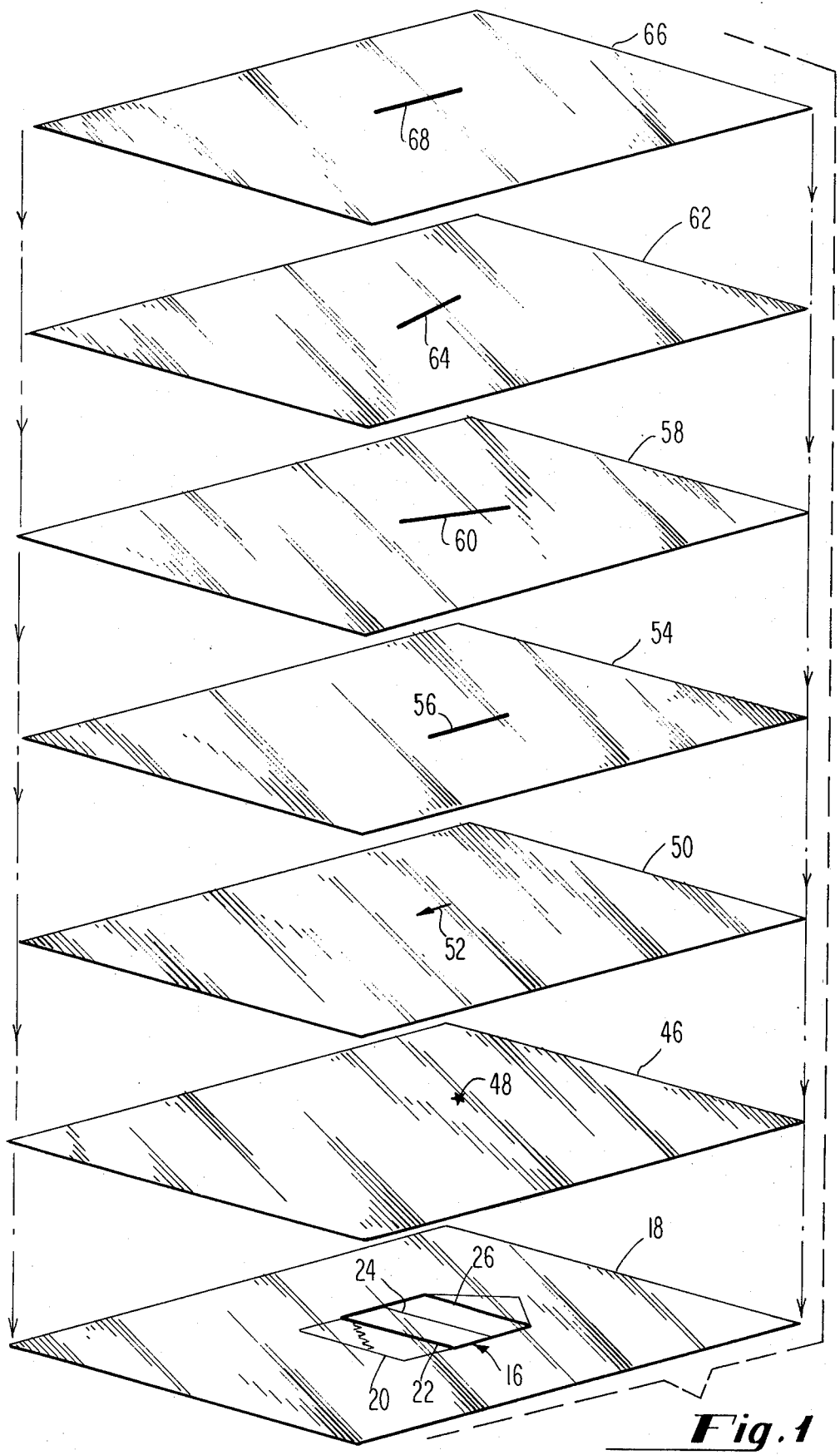
FIG. 1 is a group view illustrating the superimposition of transparencies with letter components and other indicia thereon which the teacher projects on a screen or wall to demonstrate the method of constructing and spatially arranging a given letter of the alphabet.

Thereafter additional relatively thin transparent sheets are superimposed on sheets 18, 46 and 50, the additional sheets having imprinted thereon in particular positions the components required to construct a given letter sequentially. Thus, as illustrated in FIG. 1, for the upper case letter M there will be superimposed on each other sequentially and on the sheets 18, 46 and 50 four additional relatively thin transparent sheets, the first 54 having a straight vertical line 56 thereon, the second 58 having an angled line 60 thereon, the third 62 having the angled line 64 thereon and the last 66 having the straight vertical line 68 thereon.

When fully superimposed and projected, the letter M will appear between the framing lines 22 and 26 as shown in FIG. 2 with the starting point star 48 at the upper left corner of the letter M and the arrow 52 on the side of the letter M, the bar components of the letter M overlapping at the corners.

Preferably the teacher demonstrates the complete construction of the letter at first and then repeats the superimposition of the transparencies stepwise so that the pupil can perform each step with the equivalent pieces from its kit.

Since children are first taught upper case letters, the teacher will first project superimposed transparencies with a two-story house 14 as the base. As seen in FIG. 6, to form the upper case letter B will require a transparent sheet to be so superimposed on the base sheet that the vertical bar 70 will extend between the street level 40 and ceiling level 44. Then two transparent sheets each with a U imprinted thereon on its side are superimposed so that the U shapes 72 and 74 are positioned between levels 40, 42 and 42, 44 to complete the formation of the B, the adjacent legs 76 and 78 of the U shapes overlapping at the center.

Thereafter, the teacher starts with a transparent sheet having the single story house 10 thereon, then superimposes the sheets 46 and 50 to locate the starting point and direction and finally superimposes transparent sheets with letter components thereon, such as the circle 80 and vertical bar 82 to form the lower case letter a as shown illustratively in FIG. 5, so that the letter formed is framed by the street level 30 and ceiling 32, the bar 82 overlapping the adjacent portion of the circle 80.

Thereafter, the teacher will repeat the projection of the superimposed transparencies using as the base sheet the representation of the one-story house and basement 12 as shown in FIG. 4. That figure illustrates the formation of an upper case Y and illustrates to the child the positioning of the long bar 84 at an angle between the basement floor 34 and the ceiling 38 with the shorter bar 86 at an angle to the bar 84 and positioned between the street level 36 and ceiling 38. The formation of the letter Y illustrates the use of bar or straight line components imprinted on the transparent sheets at predetermined angles and having ends cut off at angles, as seen particularly at 88 and 90.

As seen in FIG. 7, a picture 92 is hung on the blackboard or wall or set on an easel in the frame 94 of which is retained a transparent flexible plastic sheet 96, preferably vinyl, upon which is imprinted in black the three figures or diagrams of the one-story house 10, the one-story house with basement 12 and the two-story house without basement 14. Letter components as well as the starting star and arrow are provided which are made of plastic material, which when placed against the plastic sheet 96 and pressed will be removably retained thereagainst in the position placed there by the pupil. At times one may have to rub the letters with a cloth to create a static charge and thereby cause them to adhere to the sheet 96. It is also possible to provide a felt or flannel surface as a substitute for plastic surface 96 in which case the house representations and letter components will be made of fibrous material, such as felt, which will be removably retained on the felt or flannel surface. In the teacher demonstration period using the house diagram 10, 12 and 14, the pupil can practice placing the felt component parts of the letters in the houses between the framing levels and the teacher can observe the pupil's progress.

After demonstrating letter constructions for the three house FIGS. 10, 12 and 14 the teacher will thereafter use primarily the two-story with basement house diagram 16 as this has four framing levels and the pupils sense of proportioning and placing the letters can be better developed.

FIG. 3 is an example of superimposing transparencies over the base containing the house diagram 16 using a transparency with a short bar 98 arranged to be positioned between levels 22 and 24 and two inverted small U-shaped components 100 and 102 placed side by side and also arranged to fall between levels 22 and 24 to form the lower case m, the adjacent ends of the components 98, 100 and 102 overlapping.

Additionally, it should be noted that a set of 48 transparencies will be required to illustrate the construction of all the upper and lower case letters. The transparencies of a particular letter component will have an indication of the different letters for which that transparency can be used. The reason 48 transparencies will be required as distinguished from the 31 pieces in the kit, as set forth on page 6, lines 11–15, is that the components of the letters are fixed on the transparencies. Eleven extra are required which are in different positions to facilitate placement. There are also four house figures on the transparencies and the star and arrow, which are in the kit but are counted as letters.

As in the case of practicing with the three house diagrams 10, 12 and 14, a picture 104 is provided whose frame 106 retains a transparent plastic sheet 108 upon which is imprinted three house diagrams 16. The pupil will press the plastic letter components on the surface 108 in the houses 16 to practice letter construction as demonstrated through the projection of the transparencies and the teacher can observe the pupil's progress. If the surface 96 is felt or flannel, the house representations and components will be made of felt and placed on the surface there to be removably retained where placed.

The process of learning to write the letters can take several forms. The pupil can trace the letters from the starting point and in the direction of the arrow on papers having the house diagram imprinted thereon. The pupil can also be provided with writing paper having vertically spaced horizontal lines, preferably in black, but without the representation of the house, and he can practice writing the letters, preferably in green, using the lines to frame the letters as he had previously constructed them in accordance with the teacher demonstration, but this time from memory.

While preferred embodiments of the invention have been described herein, it will be understood that skilled artisans may make variations without departing from the spirit of the invention.

What is claimed is:

1. A method of teaching alphabet recognition and handwriting comprised of providing a base transparent sheet having a figure thereon with vertically spaced horizontal letter framing lines, projecting the base sheet, providing additional transparent sheets each having thereon a component portion of a letter of the complete alphabet, both lower and upper case, in a predetermined position, superimposing and projecting one of the additional sheets on the base sheet with the letter component thereof within selected horizontal framing lines, and then superimposing and projecting the remaining additional sheets sequentially and in stepwise intervals in the manner in which the letter is to be written so that the component portions cooperate to ultimately form and project the complete letter framed within selected horizontal lines of the figure of the base sheet, and so that a pupil can visualize the developmental manner of constructing, proportioning and writing the letter.

2. The method of claim 1 and interposing between the base sheet and the first one of the additional sheets having a component portion of a letter thereon, superimposed transparent sheets, one with a start indicia thereon and the other with a directional indicia thereon and projecting said starting indicia and directional indicia containing sheets sequentially or together.

3. The method of claim 1 wherein the component portions of all the letters of the alphabet, upper and lower case, comprise nine basic shapes, the U, the C, the O, the hook ∪, the diagonal line /, the vertical line |, the half circle ⊃, the dot . and the half hook ∪ .

4. The method of claim 1 wherein the figure on the base sheet is a diagram of a house, the horizontal lines being the floor and ceiling levels.

5. The method of claim 3 and providing a separate sheet with the same figure thereon as the base sheet and the vertically spaced horizontal lines, providing members formed into said basic shapes comprising the component portions of the letters and removably positioning the members on the separate sheet in the figure thereon between and framed by selected horizontal lines so that the pupil can practice forming the previously visualized letter.

6. Means for teaching alphabet recognition and handwriting comprising a base transparent sheet having a figure thereon containing vertically spaced horizontal lines, two superimposed transparent sheets, one containing a starting point indicia and the other a directional indicia on said base sheet, a first transparent letter forming sheet having imprinted thereon a component portion of a letter of the complete alphabet, both lower and upper case, on said two superimposed sheets containing the starting point and directional indicia with the imprinted component portion of said first letter forming sheet being formed by a selected pair of horizontal lines, additional transparent letter forming sheets having imprinted thereon other separate component portions of the letter superimposed on each other and on said first letter forming sheet, the component portions cooperating to form the complete letter framed by selected horizontal lines of the figure and means to project all superimposed assembled sheets on a surface, said component portions of all the letters of the alphabet, upper and lower case, comprising nine basic shapes, the U, the C, the O, the hook ∪, the diagonal line /, the vertical line |, the half circle ⊃, the dot . and the half hook ∪.

7. The combination of claim 6 wherein the figure on the base sheet is a diagram of a house, the horizontal lines being the floor and ceiling levels.

8. The combination of claim 6, and a pupil kit including at least one card with the same figure and horizontal lines imprinted thereon as appears on said base transparent sheet and members preformed into said basic shapes so that the pupil can place said members on said card within the figure framed by selected horizontal lines.

9. The combination of claim 6 and a separate plastic sheet having imprinted thereon the same figure and horizontal lines as on the base sheet and plastic members formed into said basic shapes so that the pupil can removably position said plastic members on said separate plastic sheet within said figure and between and framed by selected horizontal lines.

10. The combination of claim 6 and a separate fibrous surface, a fibrous member removably retained thereon of the same figure and horizontal lines as on the base sheet and fibrous letter components formed into said basic shapes so that the pupil can removably position them on said fibrous member within said figure and between selected horizontal lines thereof.

* * * * *

UNITED STATES PATENT OFFICE
CERTIFICATE OF CORRECTION

Patent No. 3,950,863  Dated April 20, 1976

Inventor(s) Sylvia Minka Pallishusky

It is certified that error appears in the above-identified patent and that said Letters Patent are hereby corrected as shown below:

Col. 6, line 48, "formed" should be ---framed---.

Signed and Sealed this

Twenty-fourth Day of August 1976

[SEAL]

Attest:

RUTH C. MASON
Attesting Officer

C. MARSHALL DANN
Commissioner of Patents and Trademarks